United States Patent [19]

Rohr

[11] Patent Number: 5,063,122
[45] Date of Patent: Nov. 5, 1991

[54] FUEL CELL ASSEMBLY COMPRISING PERMANENTLY COMBINED FUEL CELLS

[75] Inventor: Franz-Josef Rohr, Abtsteinach, Fed. Rep. of Germany

[73] Assignee: Asea Brown Boveri Aktiengesellschaft, Mannheim, Fed. Rep. of Germany

[21] Appl. No.: 513,926

[22] Filed: Apr. 24, 1990

[30] Foreign Application Priority Data

Apr. 29, 1989 [DE] Fed. Rep. of Germany ....... 3914244

[51] Int. Cl.$^5$ ............................................. H01M 8/10
[52] U.S. Cl. ........................................ 429/32; 429/34
[58] Field of Search ........................ 429/32, 30, 34, 33

[56] References Cited

U.S. PATENT DOCUMENTS

| | | | |
|---|---|---|---|
| 4,490,445 | 12/1984 | Hsu | 429/32 |
| 4,666,798 | 5/1987 | Herceg | 429/30 X |
| 4,770,955 | 9/1988 | Ruhl | 429/33 |
| 4,818,639 | 4/1989 | Kunz | 429/34 |
| 4,950,562 | 8/1990 | Yoshida et al. | 429/32 |

Primary Examiner—Anthony Skapars
Attorney, Agent, or Firm—Herbert L. Lerner; Laurence A. Greenberg

[57] ABSTRACT

A fuel cell assembly has at least one fuel cell with an anode, a cathode and an ion-conducting solid electrolyte. A plurality of fuel cells are combined to form a fuel cell block which meets technical requirements and can be produced cost-effectively.

5 Claims, 4 Drawing Sheets

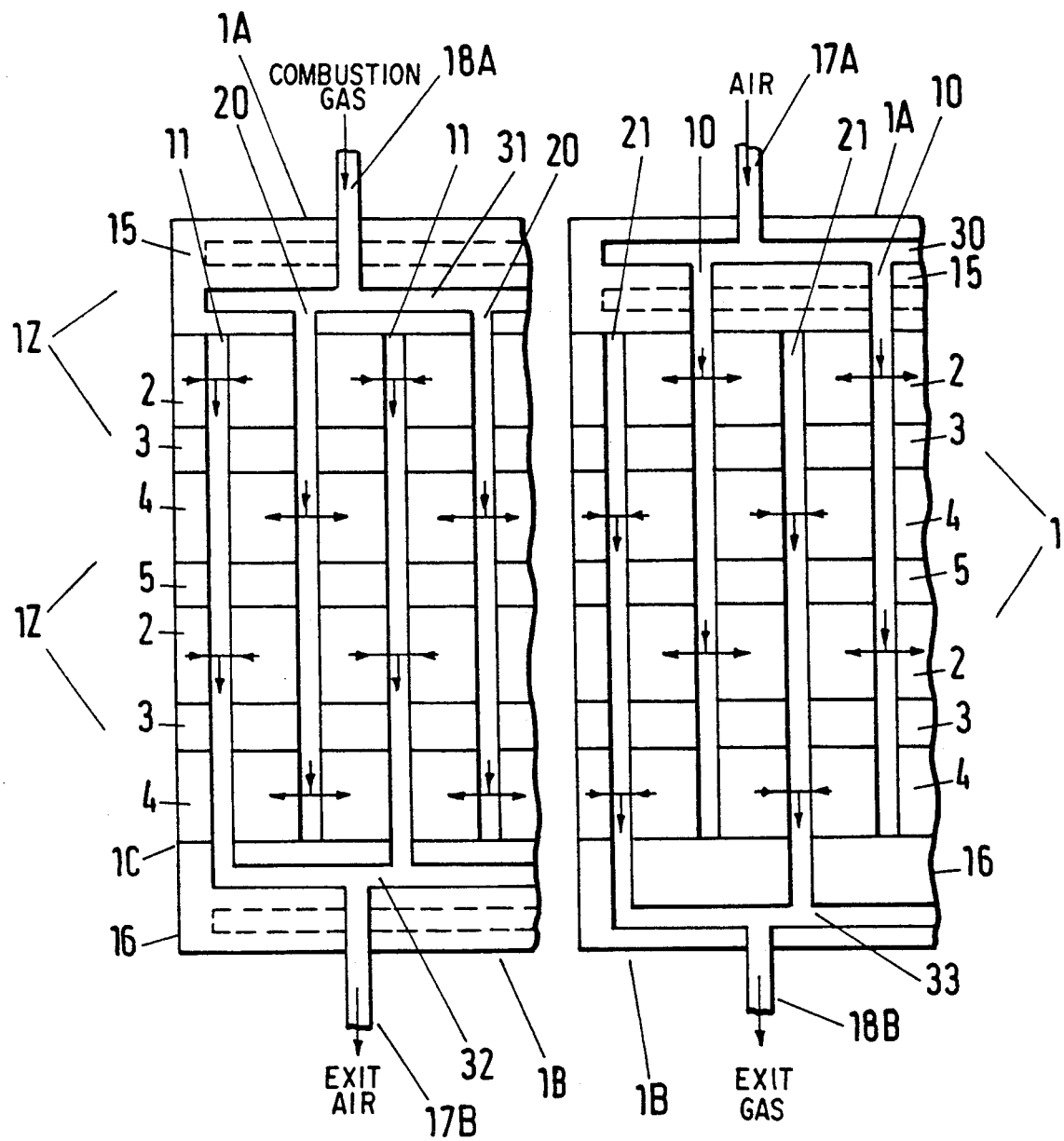

FUEL CELL ASSEMBLY COMPRISING PERMANENTLY COMBINED FUEL CELLS

The invention relates to a fuel cell assembly with at least one fuel cell having an anode, a cathode and an ion- conducting solid electrolyte, as well as to a process for the production thereof.

Such a fuel cell configuration can be used, for example, as a current source. The information journal "High Temperature Fuel Cells", Solid Electrolytes, 1978, by F. J. Rohr, discloses a ceramic fuel cell having a solid electrolyte which conducts oxygen ions, as well as an anode and a cathode. That device makes it possible to convert the chemical energy of a fuel, e.g. coal, petroleum, natural gas or hydrogen, directly into electrical energy through electrochemical oxidation with oxygen at temperatures of more than 800° C. The energy conversion takes place with an efficiency which is greater than 50%. Fuel cell configurations are known which are formed by the combination and series connection of a plurality of individual fuel cells. Those configurations are poorly suited for permanent operation. Furthermore, high material and manufacturing costs are required for their production.

It is accordingly an object of the invention to provide a fuel cell assembly and a process for the production thereof, which overcome the hereinafore-mentioned disadvantages of the heretofore-known methods and devices of this general type, which meet the requirements of technical operation and which can be produced in a simple fashion.

With the foregoing and other objects in view there is provided, in accordance with the invention, a fuel cell assembly, comprising at least two permanently combined fuel cells, each of the fuel cells having an anode, a cathode and an ion-conducting solid electrolyte.

In accordance with another feature of the invention, the fuel cells are combined to form a fuel cell block.

In accordance with a further feature of the invention, the fuel cell block includes layers such as foils being alternately stacked upon one another and serving as the cathodes, the solid electrolytes, the anodes and electrically conducting layers interconnecting the individual fuel cells.

In accordance with an added feature of the invention, the fuel cell block includes at least one group of inner layers and two outer layers, the outer layers being electrically conducting, and the at least one group of inner layers includes a middle layer serving as the solid electrolyte, a layer serving as the cathode between one of the outer layers and the middle layer, and a layer serving as the anode between the other of the outer layers and the middle layer.

In accordance with an additional feature of the invention, there is provided a another layer serving as the anode or as the cathode selectively on one or both sides of the electrically conducting layers, for extending the fuel cell block.

In accordance with yet another feature of the invention, the layers serving as the cathodes and the anodes are gas permeable and between 0.1 mm and 1 mm thick, the layers serving as the solid electrolytes and the electrically conducting layers are 50 $\mu$m to 200 $\mu$m thick, are gas-tight and have surfaces on both sides thereof with contact layers disposed on the surfaces, the layers serving as the cathodes are produced from $La_{1-x}Zr_xMnO_3$ with an addition of stabilized $ZrO_2$, the layers serving as the the anodes are produced from a material from the group consisting of $Ni/ZrO_2$ and $NiO/ZrO_2$-cermet with or without addition of stabilized $ZrO_2$, the gas-tight layers serving as solid electrolytes are produced from a material from the group consisting of $(ZrO_2)_{0.9}(Y_2O_3)_{0.1}$ and $(ZrO_2)_{0.92}(Y_2O_3)_{0.04}(Yb_2O_3)_{0.04}$, and the electrically conducting gas-tight layers are formed of a material from the group consisting of $(La_{1-x})Zr_xCrO_3$ and $LaMg_xCr_{1-x}O_3$ with the addition of stabilized $ZrO_2$.

In accordance with yet a further feature of the invention, the fuel cell block has channels for feeding and withdrawal of air and channels for feeding and withdrawal of fuel or reaction products, the channels are perpendicular to the layers and completely penetrate the fuel cell block, each respective channel for feeding air is surrounded by at least four channels for withdrawal of waste air being equally spaced apart from the channel for feeding air by 1 to 5 cm, and each respective channel for feeding fuel is surrounded by at least four channels for withdrawal of fuel and reaction products being equally spaced apart from the channel for feeding fuel by 1 to 5 cm.

In accordance with yet an added feature of the invention, the channels for feeding and withdrawal of air in the layers serving as the cathode have a diameter of 0.5 to 1 mm, and the channels for feeding and withdrawal of fuel in the layers serving as the anodes have a diameter of 1 to 3 mm.

In accordance with yet an additional feature of the invention, the channels for feeding and withdrawal of air in the vicinity the anodes, the electrically conducting layers and the solid electrolyte are gas-tightly closed towards the layers, and the channels for feeding and withdrawal or disposal of fuel in the vicinity of the cathodes, the electrically conducting layers and the solid electrolytes are gas-tightly closed towards the layers.

In accordance with again another feature of the invention, there are provided ceramic gas distribution plates at end surfaces of the fuel cell block having ducts for air, waste air, fuel, waste gas and reaction products, and other channels inside the gas distribution plates connecting respective ducts to respective channels in the fuel cell block.

With the objects of the invention in view, there is also provided a process for producing a fuel cell assembly, which comprises superimposing foils with defined properties in a defined sequence to form a fuel cell block, and combining the foils during a drying, firing and sintering process to form a permanent unit.

In accordance with another mode of the invention, there is provided a process which comprises separately producing the foils, cutting the foils to a desired cross-section of the fuel cell block, and subsequently superimposing the foils as a foil serving as a solid electrolyte between a foil serving as a cathode, a foil serving as an anode, a respective foil with electrically conducting properties directly outside the foils serving as a cathode and an anode, and another respective foil serving as an anode or a cathode on each foil with electrically conducting properties.

In accordance with a further mode of the invention, there is provided a process which comprises placing holes in the foils forming channels in the fuel cell block after the superimposition of the foils for feeding air and gaseous fuel and for withdrawal of excess air, fuel and reaction products, terminating the fuel cell block at end surfaces thereof with gas distribution plates disposed perpendicular to the channels, and combining the gas distribution plates with the foils into the unit forming the fuel cell block during the drying, firing and sintering process.

In accordance with an added mode of the invention, there is provided a process which comprises providing the channels in the foils serving as the solid electrolytes, electrically conducting layers and anodes with a diameter of from 2.5 to 6 mm, and providing the channels in the foil serving as the cathode with a diameter of from 0.5 to 1 mm less than the diameter of the channels in the foils serving as the solid electrolytes, electrically conducting layers and anodes, before the drying, firing and sintering process.

In accordance with a concomitant mode of the invention, there is provided a process which comprises providing the channels for feeding and withdrawal of fuel in the electrically conducting foils and the foils serving as a cathode with a diameter of 1.5 to 4 mm, and providing the channels for feeding and withdrawal of fuel in the foils serving as an anode with a diameter 0.5 to 1 mm less than the diameter of the channels in the electrically conducting foils and the foils serving as a cathode, before the drying, firing and sintering process.

As compared with the known fuel cell configurations, which are composed of tubular or plate-like fuel cell elements, a fuel cell configuration assembled from impermeable and porous layers offers the advantage of a high power density. The fuel cell block according to the invention with a dimension of $10 \times 10 \times 10$ cm$^3$ delivers approximately 1 kW at a voltage of 40 to 50 V. The combination of the fuel cells in a unit in the form of a fuel cell block which is assembled from a plurality of layers renders possible a simple series connection of several fuel cells. The supply of fuel and air to the fuel cells is possible in a simple fashion through the configuration of channels in the fuel cell block. The same holds true for the withdrawal of the excess air, the reaction products and the unburnt fuel. The cooling of the fuel cell configuration is equally possible in a simple fashion through the use of the channels which pass through the fuel cell block. Since it is possible for the block to be constructed as large or as small as desired, it is easy to tune the fuel cell configuration to the desired power. The production of the fuel cell configuration is very cost effective, since mass production of the foils required for assembling a fuel cell block is possible. The methods applied to produce the foils already belongs to the prior art and can therefore be applied without any problem.

Other features which are considered as characteristic for the invention are set forth in the appended claims.

Although the invention is illustrated and described herein as embodied in a fuel cell assembly and a process for the production thereof, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 4 is a fragmentary, sectional view of a complete fuel cell block.

Figure 1:
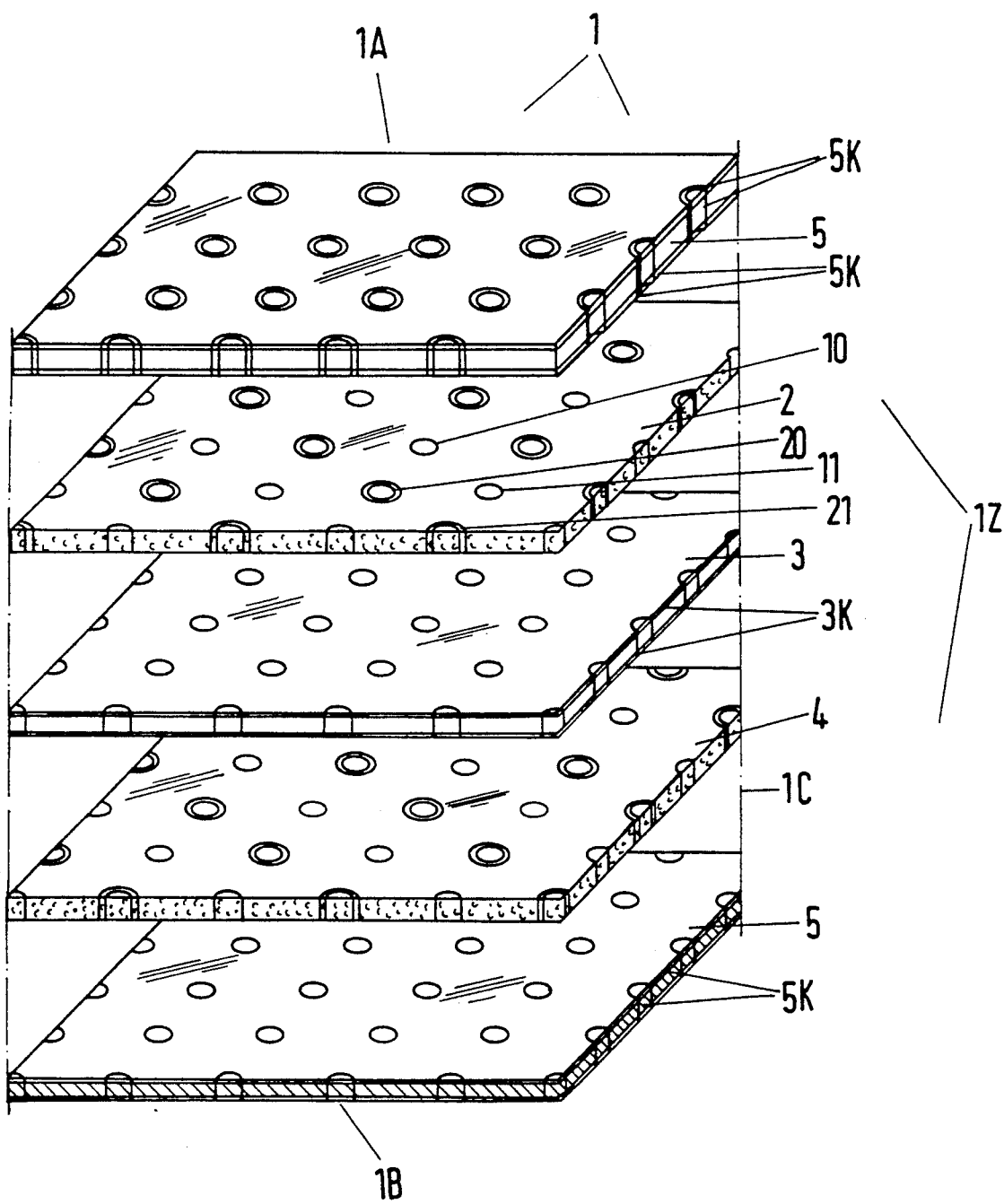
FIG. 1 is an exploded perspective view of a fuel cell block according to the invention.
Figure 2A:
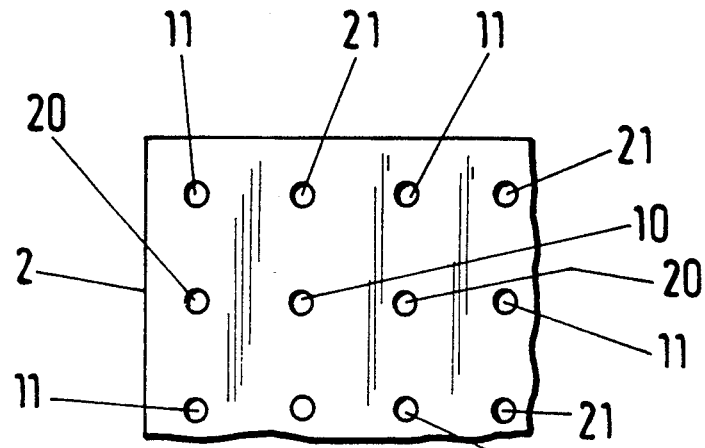
FIG. 2 is a fragmentary, top-plan view of the foils employed for the fuel cell block.
Figure 2B:
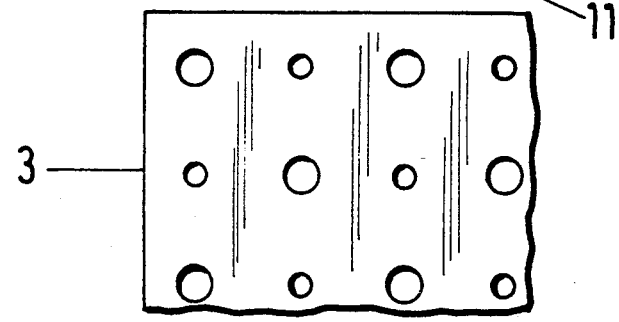
Figure 2C:
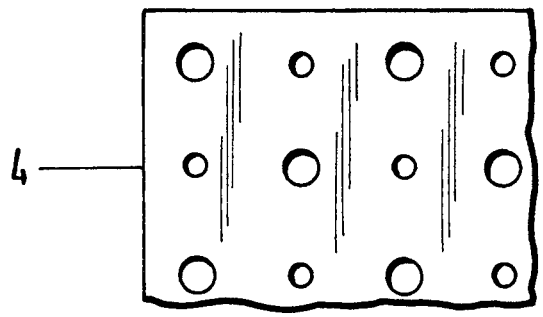
Figure 2D:
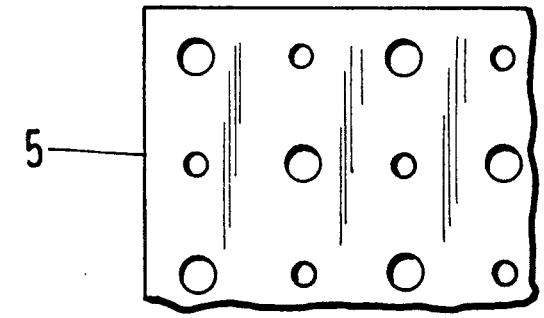
Figure 3A:
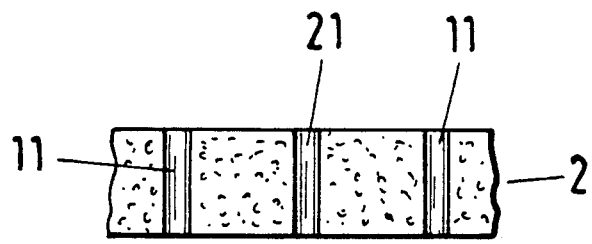
FIG. 3 is a fragmentary, vertical-sectional view of the foils employed for the assembly of the fuel cell block.
Figure 3B:
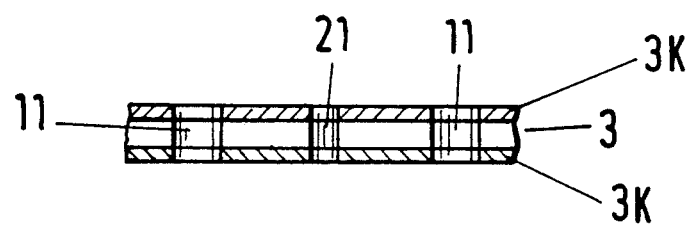
Figure 3C:
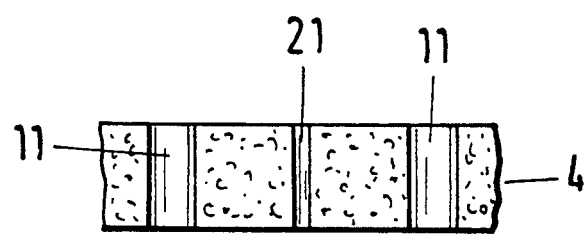
Figure 3D:
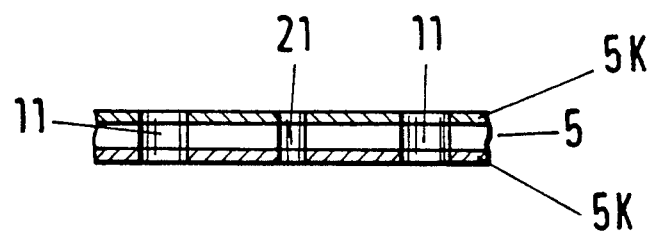

Referring now to the figures of the drawing in detail and first, particularly, to FIG. 1 thereof, there is seen part of a fuel cell block 1 with layers 2, 3, 4, 5 which are necessary for the assembly. In order to improve the clarity of the drawing, the layers 2, 3, 4 and 5 are not disposed directly adjacent one another, but instead a gap has been left between each two layers. In an operationally ready fuel cell block 1, all layers 2, 3, 4, 5 are stacked one upon another. The construction of the fuel cell block 1 according to the invention requires at least one layer 2 serving as a cathode, one layer 3 serving as a solid electrolyte, one layer 4 serving as an anode, as well as electrically conducting layers 5. The layers 5 are provided for electrical connection between fuel cells 1Z of each fuel cell block 1. Therefore, a fuel cell block 1 includes at least one group of inner layers 2, 3, 4 and two outer layers 5. Air is supplied to the layers 2, fuel is supplied to the layers 4, and the layers 3 assume the function of an ion conducting separating layer between the cathode 2 and anode 4. By virtue of the layer sequence represented in FIG. 1, a fuel cell block 1 is formed which has the minimum number of required layers 2, 3, 4, 5. According to the invention, the possibility exists of extending the block 1 as much as desired, by once again attaching a cathodic layer 2 or an anodic layer 4 to each electrically conducting layer 5. The size of a fuel cell block 1 can amount to from a few cubic centimeters to a few cubic decimeters and more. The layers 2, 3, 4 and 5 are formed by foils which are produced in a separate production process and subsequently stacked upon one another. During a firing process and a subsequent sintering process, the layers 2, 3, 4 and 5 are permanently joined at a definite temperature. As can be seen from FIG. 1, the layers 2, 3, 4 and 5 are penetrated by channels 10, 11, 20 and 21. The channels 10, 11, 20 and 21 extend perpendicular to the surfaces of the layers 2, 3, 4, and 5. With the aid of the channels 10, 11, 20, 21, the required air and the fuel are supplied to to the layers 2, 4, waste air is withdrawn from the block 1, and reaction products and excess fuel are disposed of. Air is supplied with the aid of the channels 10 to the layers 2 serving as a cathode, only one such layer 2 being present in the illustrative embodiment represented in FIG. 1. Waste air is withdrawn through the channels 11. Gaseous fuel is fed to the anodic layers 4 with the aid of the channels 20. Reaction products and excess fuel are withdrawn through the channels 21. The channels 10 are sealed gas tight in the regions of the layers 3, 4, 5 towards these layers, so that no air can exit from the channels 10 in those regions. It is only in the region of each layer 2 that the channels 10 are permeable to air and thus are able to supply the layers 2 with air. The channels 11 are constructed in an appropriate fashion for withdrawal of waste air. The supply of gaseous fuel to the anodic layers 4 takes place through the channels 20. The channels 20 are only permeable to gas in the region of the anodic layers 4 and their walls are gas-tightly sealed in the region of the remaining layers 2, 3, 5. The channels 21, which are provided for disposal, are constructed in the same way.

FIG. 2 shows parts of the layers 2, 3, 4 and 5 in the region of the surfaces thereof. As may be gathered from this representation, each channel 10 is surrounded by four channels 11, all of which are disposed at the same spacing from the channel 10. In the illustrative embodiment represented in FIG. 2, in each case the channel 10 is disposed at the midpoint of a square, while the channels 11 are located at the corners of the square. Each channel 20 is positioned in the same way as the channel 10. In this regard, four channels 21 are likewise disposed at the same spacing from the channel 20. The separation of the channels 10 and 11 or 20 and 21 amounts to between 1 and 5 cm.

FIG. 3 shows a vertical section through the layers 2, 3, 4 and 5 in the region of the channels 11 and 21. As may be gathered from this representation, the channels 11 and 21 have different diameters in different layers 2, 3, 4, 5. The same holds for the channels 10 and 20 which are not represented in FIG. 3. The diameters of the channels 10, 11, 20 and 21 are dependent upon the length of the channels, which in turn is determined by the height of the fuel cell block 1. The amount of air to be supplied to the cathodic layers 2 must be several times greater than the amount of fuel supplied to the anodic layers. Consequently, the amount of air to be withdrawn must also be correspondingly greater than the amount of the reaction products and the amount of excess fuel. It can be assumed that the diameters of the channels 10 and 11 are to be constructed two to three times greater than the diameters of the channels 20 and 21. The configuration of the channels 10, 11, 20 and 21 is not limited to the embodiment described herein. Rather, all possibilities which ensure an optimal supply and disposal are permissible. The pressure drop between the channels 10 and 11 or the channels 20 and 21 is set in such a way that inside the cathodic or anodic layers 2 or 4, the air or the fuel and the reaction products flow only in the direction of the channels 11 or 21 provided for withdrawal. The distribution of the air and of the fuel or the withdrawal of the unconsumed air or of the excess fuel and of the reaction products takes place, for example, through gas distribution plates, which can be disposed on end surfaces 1A and 1B of each fuel cell block 1.

FIG. 4 shows a part of a fuel cell block 1, which is provided with gas distribution plates 15 and 16 on its end surfaces 1A and 1B. Air and gaseous fuel are supplied to the fuel cell block 1 through the gas distribution plate 15. For this purpose, the gas distribution plate 15 is provided with a feed 17A for air and a feed 18A for the fuel. Channels 30 and 31 are provided inside the gas distribution plate 15. The air is fed to the channels 10 through the channels 30. The feeding of the gaseous fuel to the channels 20 takes place through channels 31. As may also be gathered from FIG. 4, air can flow from the channels 10 into the layers 2. The fuel flowing in the channels 20 can penetrate into the layers 4. The unconsumed air is withdrawn to the outside through the channels 11, a channel 32 in the gas distribution plate 16 and a duct 17B. The resulting reaction materials and the excess fuel are supplied through the channels 21 to a channel 33 in the gas distribution plate 16 and are withdrawn from there to the outside through a duct 18B. The gas distribution plates 15 and 16 are produced from an electrically conducting material, so that they can simultaneously serve as a positive or negative current collector.

The production of a fuel cell block 1 is described below. As already mentioned above, the layers which form the fuel cell block are formed by foils 2, 3, 4 and 5. These foils 2, 3, 4 and 5 are firstly produced individually from a mixed oxide. The known foil casting technique or the silk-screen process can, for example, be applied for the production. In order to produce the foils 2, 3, 4 and 5, a casting slip of the powders of the inorganic mixed oxide is firstly formed. Zirconium dioxide, which is doped with 8 to 10 mol % of yttrium oxide, is employed as a material for the construction of the foils 3. Materials with perovskite structure are employed to produce the foils 2 and 5, and zirconium dioxide cermets with nickel are used for the foils 4. The gas-tight layers are produced from a powder which has a particle size of 0.1 to 3 $\mu$m. A mixed oxide powder with a particle size of between 10 and 100 $\mu$m is used to construct the porous layers. The density or porosity of the foils 2, 3, 4 and 5 can be influenced by the addition of defined amounts of organic binding and dispersing agents in the form of mixtures of simple alcohols and polyalcohols. When selecting the material employed for producing the foils 2, 3, 4 and 5, care should be taken to ensure that these materials have an expansion coefficient which amounts to approximately $10.5 \times 10^{-6}$/degree at 1000° C. In any event, it must be ensured that the material employed for producing the solid electrolyte simultaneously has the property of an oxygen ion conductor. For the production of the foils 2 and 4, which must have the properties of cathodes or anodes and be electron conducting, preference is given to the employment of a mixture or a cermet of $La_{1-x}Sr_xMnO_2 + ZrO_2/Y_2O_3$(strontium-doped lanthanomanganite and yttrium-doped zirconium dioxide) or $Ni + ZrO_2/Y_2O_3$(nickel and yttrium-doped zirconium dioxide). For the foils 3 and 5, which are provided as solid electrolytes and electrically conducting interconnector layers, preference is given to the employment of $ZrO_2/Y_2O_3$ (yttrium-doped zirconium dioxide) or $LaMg_xCr_{1-x}O_3$ (magnesium-doped lanthanum chromite), organic binding and dispersing agents in the form of a mixture of simple alcohols and polyalcohols being additionally added to this material. The foils 3 and 5 serving as solid electrolytes and electrically conducting interconnector layers are firstly produced in accordance with one of the processes described above. Subsequently, the surfaces are coated with thin contact layers 3K and 5K, as represented in FIG. 3. These compact layers 3K and 5K can, for example, be formed by screen printing from a solution or a suspension. In order to form the contact layers 3K and 5K, cathode material, such as is used to produce the foils 2, is employed on the cathode side, and anode material, such as is used for the foils 4, is employed on the anode side. After the foils 2, 3, 4 and 5 have been produced, they are cut in such a way that their surfaces correspond to the cross-section of the fuel cell block 1 to be produced. The gas-tight foils 3 and 5, which serve as solid electrolytes or electrically conducting layers, are constructed to be 0.05 to 0.1 mm thick, while the foils 2 and 4 serving as cathodes or anodes are constructed to be 0.1 to 1 mm thick. Subsequently, the foils are provided with holes, which form the channels 10, 11, 20 and 21 after the superimposition of the foils 2, 3, 4 and 5 to the desired fuel cell block. The holes 10 and 11 are constructed in the foils 3, 4 and 5 with a diameter of 2.5 to 6 mm. In the foils 2 which serve as cathodes, the holes 10 and 11 are constructed with a diameter which is 0.5 to 1 mm smaller. The channels 10 and 11 in the foils 2 preferably have a diameter of 2 to 5 mm. The holes 20 and 21 are constructed in the foils 2, 3 and 5 with a diameter of 1.5 to 4 mm. In the foils 4 serving as anodes, the holes 20 and 21 have a diameter of 1 to 3 mm, which is therefore 0.5 to 1 mm smaller than in the foils 2, 3 and 5. The foils 2, 3, 4 or 5 are superimposed according to the sequence represented in FIG. 4, in order to construct a fuel cell block 1. Only the sequence of the foils 2, 3, 4 and 5 is prescribed, but their number is not limited to the number represented in FIG. 4. Rather, a fuel cell block 1 can be constructed to be substantially larger. The minimum size of a fuel cell block 1 includes a foil 2, a foil 3, a foil 4 and, on the end surfaces 1A and 1B, either a gas distribution plate 15 or 16, or an electrically conducting foil 5, which simultaneously serves as a current collector. In this regard, care must be taken to ensure that the holes punched out of the foils are disposed above one another in such a way that the channels 10, 11, 20 and 21 are formed. For this purpose, it is preferable to employ a mounting frame having vertical guide pins which can be accurately inserted through the holes in the foils 2, 3, 4 and 5. The stack of foils 2, 3, 4, 5 which is thus superimposed and can be formed of 16 to 20 foils or 4 to 5 such fuel cells 1Z per cm of height, is converted during a temporally defined drying, firing and sintering process into a ceramic block with the desired layer structure. During the drying phase, the organic solvents are removed from the foils 2, 3, 4 and 5 at a temperature of 100° to 300° C. and at reduced pressure over a period of 1 to 4 hours. In the subsequent firing phases any organic compounds of the binding and dispersion agents employed which are present in the foils 2, 3, 4 and 5, are burned at 300° C. to 1000° C. in the presence of oxygen or air and converted into gaseous reaction products, so that the foils 2, 3, 4 and 5 or the layers formed after the combustion process are formed only of mixed oxides. The duration of the firing process amounts to approximately 2 to 5 hours. The sintering process following the firing process is carried out at a temperature of 1000° to 1500° C. to form gas-tight layers 3 and 5 and porous layers 2 and 4 as well as the channels 10, 11, 20 and 21 in the fuel cell block 1. The sintering process lasts two to ten hours depending upon the size of the fuel cell block 1. In order to seal the channels 10 and 11 from the layers 3, 4, 5, and also to seal the channels 20, 21 from the layers 2, 3, 5, and also in order to avoid gas losses and electrical short circuits at the outer surfaces of the fuel cell block 1, gas-tight electrically insulating layers of a spinel in the form of $MgAl_2O_3$ or a sintered glass ceramic in the form of $MgO \cdot Al_2O_3 \cdot ZrO_2$ are applied in the channels 10, 11, 20 and 21 and on the outer surfaces 1C of the fuel cell block 1. A finely powdered suspension of the material named above is formed for this purpose. Subsequently, the entire fuel cell block 1 is immersed in the suspension. Before the immersion of the block, the end surfaces of the gas distribution plates 15 and 16 or, if only electrically conducting layers 5 are employed, the surfaces 1A and 1B of these layers 5, are masked with a substance which can later be removed once again, so that these surfaces 1A and 1B can later be exposed once again. After being dried, the suspension is fired at 1000° to 1300° C., forming an impermeable glaze. After firing, the glaze is once again removed by reboring in the channels 10 and 11 in the region of the layers 2 serving as cathodes. The same holds true for the channels 20 and 21 in the region of the anodic layers 4. This reboring in the region of the cathodic and anodic layers 2 and 4 is possible because the channels 10 and 11 or 20 and 21 in the region of the above-mentioned layers 2 and 4 are constructed with a diameter which is up to 1 mm smaller than the diameter of the channels in the remaining layers. The size of the drill must be dimensioned in such a way that the glaze in the remaining layers 3 and 5 is not damaged, but that complete removal of the glaze is ensured in the layers 2 and 4 and in the respective channels 10, 11 or 20 and 21. It is achieved in this way that air and waste air can only flow into or out of the layers 2 serving as a cathode, and that fuel, waste gases and reaction products can thus only be introduced into or withdrawn from the layers 4 serving as an anode. The plates 15 and 16 provided for the gas distribution are likewise produced separately and subsequently combined with the fuel cell block 1 in such a way that the channels 30, 31, 32, 33 provided in the gas distribution plates 15 and 16 are connected with the corresponding channels 10, 11, 20 and 21. The gas distribution plates 15 and 16 are likewise produced from ceramic material and in a manner similar to these foils and are fired and sintered together with the remaining foils 2, 3, 4 and 5 to form the desired fuel cell block 1. Through the use of a suitable coating with an electrically conducting material in the form of $Ni/ZrO_2$, $La_{1-x}Sr_xMnO_3$ or $La_{1-x}Sr(Mg)_xCrO_3$, the gas distribution plates 15 and 16 can be employed simultaneously as current collectors or for the electrical switching of a plurality of the fuel cell blocks 1 described above. It is, of course, possible to have a different configuration of the gas distribution plates or of the components 15 and 16 serving as end plates and current collector plates.

I claim:

1. Fuel cell assembly, comprising at least two permanently combined fuel cells each having an anode, a cathode and an ion-conducting solid electrolyte, and said fuel cells being combined to form a fuel cell block including at least one group of inner layers and two outer layers, said outer layers being electrically conducting, and said at least one group of inner layers including a middle layer serving as said solid electrolyte, a layer serving as said cathode between one of said outer layers and said middle layer, and a layer serving as said anode between the other of said outer layers and said middle layer, wherein said layers serving as said cathodes and said anodes are gas permeable and between 0.1 mm and 1 mm thick, wherein said layers serving as said solid electrolytes and said electrically conducting layers are 50 $\mu$m to 200 $\mu$m thick, are gas-tight and have surfaces on both sides thereof with contact layers disposed on said surfaces, said fuel cell block having channels for feeding and withdrawing air and channels for feeding and withdrawing fuel and reaction products, said channels being substantially perpendicular to said layers and completely penetrating said fuel cell block, each respective channel for feeding air being surrounded by at least four channels for withdrawing air equally spaced apart from said channel for feeding air by 1 to 5 cm, and each respective channel for feeding fuel being surrounded by at least four channels for withdrawing fuel and reaction products equally spaded apart from said channel for feeding fuel by 1 to 5 cm, said channels for feeding and withdrawing air in said layers serving as said cathode having a diameter of 0.5 to 1 mm, and said channels for feeding and withdrawing fuel in said layers serving as said anodes having a diameter of 1 to 3 mm, said channels for feeding and withdrawing air in the vicinity of said anodes, said electrically conducting layers and said solid-electrolyte being gas-tightly closed towards said layers, and said channels for feeding and withdrawing fuel in the vicinity of said cathodes, said electrically conducting layers and said solid electrolytes being gas-tightly closed towards said layers, and including ceramic gas distribution plates at end surfaces of said fuel cell block having ducts for air, waste air, fuel, waste gas and reaction products, and other channels inside said gas distribution plates connecting respective ducts to respective channels in said fuel cell block.

2. Fuel cell assembly according to claim 1, including another layer serving as said anode on one of said electrically conducting layers, for extending said fuel cell block.

3. Fuel cell assembly according to claim 1, including another layer serving as said cathode on one of said electrically conducting layers, for extending said fuel cell block.

4. Fuel cell assembly according to claim 1, wherein said layers serving as said cathodes are produced from $La_{1-x}Zr_xMnO_3$ with an addition of stabilized $ZrO_2$, wherein said layers serving as said anodes are produced from a material selected from the group consisting of $Ni/ZrO_2$ and $NiO/ZrO_2$-cermet, said gas-tight layers serving as solid electrolytes are produced from a material selected from the group consisting of $(ZrO_2)_{0.9}(Y_2O_3)_{0.1}$ and $(ZrO_2)_{0.92}(Y_2O_3)_{0.04}(Yb_2O_3)_{0.04}$, and said electrically conducting gas-tight layers are formed of a material selected from the group consisting of $(La_{1-x})Zr_xCrO_3$ and $LaMg_xCr_{1-x}O_3$ with the addition of stabilized $ZrO_2$, and all layers are formed of foils.

5. Fuel cell assembly according to claim 2, including stabilized $ZrO_2$ added to said material selected from the group consisting of $Ni/ZrO_2$ and $NiO/ZrO_2$-cermet of said layers serving as said anodes.

* * * * *